United States Patent [19]
Mondragon et al.

[11] Patent Number: 5,614,459
[45] Date of Patent: Mar. 25, 1997

[54] PROCESS FOR MAKING ACTIVATED CHARCOAL

[75] Inventors: Fanor Mondragon; John Fernandez; Alfredo Jaramillo; Gustavo Quintero, all of Medellin, Colombia

[73] Assignee: Universidad de Antioquia, Medellin, Colombia

[21] Appl. No.: 483,093

[22] Filed: Jun. 7, 1995

[51] Int. Cl.$^6$ .................................................. B01J 20/02
[52] U.S. Cl. ........................ 502/417; 502/416; 502/418; 502/424; 502/180
[58] Field of Search ................................... 502/416, 417, 502/418, 424, 180

[56] References Cited

U.S. PATENT DOCUMENTS

| | | | |
|---|---|---|---|
| 3,676,365 | 7/1972 | Shirai et al. | 252/422 |
| 5,206,207 | 4/1993 | Tolles et al. | 502/424 |
| 5,250,491 | 10/1993 | Yan | 502/424 |
| 5,504,050 | 4/1996 | Hayden | 502/180 |

FOREIGN PATENT DOCUMENTS

| | | |
|---|---|---|
| 0329251 | 8/1989 | European Pat. Off. . |
| 146277 | 2/1981 | Germany . |

OTHER PUBLICATIONS

Miura et al. "New Coal Flash Pyrolysis Method Utilizing Effective Radical Transfer From Solvent To Coal", *Energy & Fuels* 5(2): 340–346 (1991) (Abstract).

Suuberg et al. "Coal Macromolecular Network Structure Analysis: Solvent Swelling Thermo–dynamics and Its Implications", *Energy & Fuels* 8: 1247–1262 (1994).

Caturla et al. "Preparation of Activated Carbon By Chemical Activation With $Z_nCl_2$", *Carbon* 29(1): 999–1007 (1991).

Caio et al. "Ativacao de Hulhas, Lignitos E Turfax Brasileiras—Producao E Aplicacao Em Operacoes . . . ", *Revista Brasileira de Tecnologia* 10: 93–107 (1979).

Bansal et al. "Manufacture of Active Carbons", *Active Carbon*, Marcel Dekker, Inc., New York, pp. 1–26 (1988).

*Primary Examiner*—Glenn A. Caldarola
*Assistant Examiner*—In Suk Bullock
*Attorney, Agent, or Firm*—Foley & Lardner

[57] ABSTRACT

An improved process is provided for the preparation of activated carbon, which comprises swelling a carbonaceous material in a polar organic solvent containing an activating agent, removing the solvent, carbonizing the material, and removing the activating agent from the product. The activated carbon is produced in a short time with a high yield, and has a high surface area with a very narrow pore size distribution. Both the solvent and activating agents may be recovered and recycled.

10 Claims, No Drawings

PROCESS FOR MAKING ACTIVATED CHARCOAL

BACKGROUND OF THE INVENTION

1. Field of the Invention

The present invention relates to activated carbon and methods for preparing the same. Particularly, the invention relates to an improved process for preparing activated carbon with a high surface area by swelling a carbon-containing material in a polar solvent containing oxidizing agents prior to carbonization.

2. Description of the Prior Art

Activated carbon is a microcrystalline, nongraphitic form of carbon which has been processed to increase its porosity. Activated carbon is characterized by a large specific surface area, typically in the range of 800 to 1500 $m^2$ per gram, and in some cases as high as 2500 $m^2$ per gram.

Due to its large surface area, activated carbons have a great variety of applications, both as catalyst supports and adsorbents. As catalyst supports, activated carbons provide large surface areas for chemical reactions and are more stable at high temperatures than common inorganic sieves.

The adsorbent properties of activated carbon is the result of its large surface area, high degree of surface reactivity, and favorable pore size that make the internal surface area accessible to gases and liquids. (Bansal et al., Activated CARBON, Marcel Dekker, Inc., New York, pp 1–26 (1988)). Generally, the larger the surface area of the activated carbon, the greater is its adsorption capacity. The available surface area of activated carbon is dependent upon its pore volume. Since the surface area per unit volume decreases as individual pore size increases, a large surface area is optimized by maximizing the number of pores of very small dimensions and/or minimizing the number of pores of very large dimensions.

As adsorbents, activated carbons can be used in environmentally-related processes to remove pollutants from liquid and gaseous streams very efficiently. Activated carbons may also be used for gaseous storage materials. One of the most promising applications is for methane storage. The adsorption of methane in the micropores of activated carbon increases the density of the gas. Thus, the amount of methane that can be stored using the adsorbent is much higher than can be obtained under pressure.

Different kinds of raw materials have been made into activated carbons, including cellulosic materials of various plant origins, peat, lignite, soft and hard coals, tars and pitches, asphalt, petroleum residues, carbon black, and polymers such as poly(vinylidenechloride), Saran, and poly(vinylchloride). Coal, particularly the low rank type, has been found to be a good raw material for the production of activated carbons.

The preparation of activated carbons generally involves two steps. The first step is carbonization of the carbonaceous raw material at temperatures below 800° C. in the absence of oxygen, and the second step is activation of the carbonized product. (Bansal et al., Activated CARBON, Marcel Dekker, Inc., New York, pp 1–26 (1988)).

During the first step of carbonization, most of the noncarbon elements such as oxygen and hydrogen are eliminated as volatile gases by pyrolytic decomposition of the starting material. The residual carbon material forms an irregular structure, leaving free interstices that may be filled or blocked by disorganized carbon resulting from deposition of tars. Thus, because the pores of the product are not fully developed and therefore the surface area is low, carbonization does not give rise to products that have high adsorption capacity.

Carbonization involves two important physical changes in the raw material that markedly determine the properties of the final product. The first change is a thermal softening of the material, induced by heating. During this change, it is important to control the temperature, as the temperature and its rate of change affect the type of char obtained. After the thermal softening period, the char undergoes a second change as it begins to harden and shrink. This shrinkage also plays a role in the development of porosity in the char. For example, when soft coal is used as the starting material, the temperature rise during the softening stage should be very slow, so that the gases can escape through the pores in the granules without a collapse or deformation of the pores.

Activation, the second step of producing activated carbon, enhances the rudimentary pore structure formed during carbonization. During this step, the diameter of the pores is enlarged and the volume of the pores is increased. Activation is carried out by an oxidation reaction at high temperatures. The oxidizing agents are usually steam, carbon dioxide, air, or a mixture of these. During this physical activation, the char is partially gasified, thus resulting in some loss of the carbonized material. However, oxidation converts the carbonized raw material into a form that contains the greatest possible number of randomly distributed pores of various shapes and sizes, and a final product with a high surface area.

Carbonization and activation are sometimes carried out simultaneously, by thermal decomposition of the raw material impregnated with chemical activating agents. These activating chemicals are both dehydrating agents and oxidants. The dehydrating activity inhibits the formation of tar, thus enhancing the yield of carbon in the final product. For example, carbonization may be carried out in the presence of chemical reagents such as phosphoric acid, potassium hydroxide, calcium chloride, or zinc chloride.

The most common method of simultaneous carbonization and oxidation is to impregnate the raw material with an activating agent. This is accomplished by soaking the raw material in a concentrated aqueous solution of the reagent, sometimes accompanied by mixing and kneading. The water is then evaporated from the chemically impregnated material, and the resulting mixture is carbonized in the absence of air (such as under nitrogen) at temperatures between 400° and 800° C., depending upon the activating agent used. These temperatures are lower than those needed for "physical activation," and result in better porous structural development. The carbonized material is then washed to remove the chemical reagent, which may then be recovered and recycled. The surface area of this material is usually further increased by gasification. This step also results in further loss of carbonized material.

One early method and apparatus for the manufacture of activated charcoal in which the carbonizing and activating steps were combined in a single unit was provided by Shirai et al., U.S. Pat. No. 3,676,365. The disclosed process allowed continuous performance of the carbonization and activation steps at high efficiency. In this method, production of activated carbon occurred by impregnation of a carbon source with a solution of $ZnCl_2$ and hydrochloric acid.

Several other methods of chemically activating a carbon source prior to pyrolysis to produce activated carbon are described by Zhiquan Q. Yan, U.S. Pat. No. 5,250,491; Caio et al., *Revista Brasileira de Tecnologia*, 10:93–107 (1979); East German Patent No. 146 277; European Patent Application No. 0 329 251; and Caturla et al., *Carbon* 29: 999–1007 (1991). These methods of combining carbonization with chemical activation suffer from several limitations. Gasification following the carbonization step usually results in a loss of about 25% of the activated carbon. Diffusion of the activating agent into the raw material is limited by the degree of penetration of the activating agent into the innermost part of the coal particles.

An efficient method of producing activated charcoal of high surface area and narrow pore size distribution is needed.

SUMMARY OF THE INVENTION

Accordingly, it is an object of the present invention to provide an activated carbon with a high surface area and a very narrow pore size distribution, suitable for methane and natural gas storage, as well as for environmental control of NOx gasses.

It is a further object of the present invention to provide a method of chemical activation in which the recovery of the activated carbon is very high compared to other methods.

Another object of the present invention is to provide a process in which carbonization occurs in a very short time period.

These and other objects of the present invention are achieved by providing a process for preparing activated carbon, comprising the steps of swelling a carbon-containing material in a polar organic solvent containing $ZnCl_2$ or $SnCl_2$, separating the solvent, carbonizing the carbon-containing material under nitrogen at a temperature in the range from 600° to 750° C. and separating the $ZnCl_2$ or $SnCl_2$.

Other objects, features and advantages of the present invention will become apparent from the following detailed description. It should be understood, however, that the detailed description and specific examples, while indicating preferred embodiments of the invention, are given by way of illustration only. Indeed, various changes and modifications within the spirit and scope of the invention will become apparent to those skilled in the art from the detailed description.

DETAILED DESCRIPTION OF PREFERRED EMBODIMENTS

A method of preparing activated carbon with a high surface area is provided comprising the steps of swelling a carbon-containing material in a polar organic solvent containing zinc chloride ($ZnCl_2$) or stannous chloride ($SnCl_2$); separating the solvent; and carbonizing the carbon-containing material under nitrogen at a temperature in the range of 600° to 750° C. Optionally, the solvent can be recovered and recycled. The $ZnCl_2$ or $SnCl_2$ can be removed from the final product by washing and can also be recovered and recycled. The carbon-containing material can be coal, such as low rank coal including Amaga or Cerrejon coals. Activated carbon made by the method of the present invention has a large surface area, as determined by the Brunauer-Emmett-Teller (BET) model of physical adsorption, and a large micropore area and micropore volume. The method requires only a short carbonization time, and it results in a high recovery of the final product.

The source of carbon-containing raw material may be any of the carbonaceous material of plant or mineral origin described previously. Preferred raw materials are primarily coals, including low rank coals such as Amaga and Cerrejon. The raw material is ground, then separated into the appropriate sized fraction, and finally stored in a dried, desiccated form until used.

The raw material is then mixed with a solvent containing the appropriate activating agent. The activating agent is first dissolved into the solvent to the desired concentration; in some cases, heating the solvent may be necessary for complete dissolution. The coal is slowly added with continuous stirring to the solvent containing dissolved activating agent.

Chemical activating agents may include: alkali metal hydroxides, carbonates, sulfies, and sulfates; alkaline earth carbonates, chlorides, sulfates, and phosphates; phosphoric acid; polyphoSphoric acid; pyrophosphoric acid; zinc chloride; sulfuric acid; and oleum. Preferred among these are zinc chloride or stannous chloride. The concentration of activating agent may vary from 10% to 100%; the preferred concentration is 100%.

Polar organic solvents include any organic hydrogen-bonding solvent capable of swelling the carbonaceous material. Such solvents can form strong hydrogen bonds with the functional groups of the carbonaceous material. Preferred solvents include pyridine, n-propylamine, n-butylamine, tetrahydrofuran, n-methylpyrrolidinone, dimethyl sulfoxide, methanol, ethanol and isopropanol. Pyridine is particularly preferred. The coal:solvent ratio may vary from 1:4 to 1:10, with a preferred ratio of 1:6 (weight:volume, g:ml).

The mixture of carbonaceous material and solvent-activating agent may be left for up to 24 hours. However, the impregnation time may be as short as 1 hour, as the kinetics of solvent swelling of coal are very fast, and the diffusion of activating agent into the coal is presumably equally fast.

The solvent is recovered from the impregnated carbonaceous material by evaporation under slow heating at a specified temperature under an inert atmosphere until the impregnated carbonaceous material is completely dry. If desired, the solvent may then be recovered for reuse. Evaporation of the solvent under higher temperatures will result in a more rapid drying of the material. The appropriate temperature will vary with the solvent used; for example, if pyridine is used as the swelling solvent, a low evaporation temperature is about 70 ° C., while a higher temperature is about 120 ° C. An inert atmosphere may be achieved by drying the material under nitrogen.

The dried impregnated carbonaceous material is then pyrolyzed under an inert atmosphere. The temperature of pyrolysis may vary from 600° to 750° C. An inert atmosphere may be achieved by pyrolysis under nitrogen, for example under a flow of nitrogen of 100 to 120 ml/min. Pyrolysis is complete within 15 min, though times up to 60 min may be used. After pyrolysis, the activated carbon is cooled under an inert atmosphere; when cooled to about 100° C., the activated carbon may be removed from the furnace.

The activating agents may be removed from the activated carbon by washing the activated carbon with water. Hot distilled water is preferred; depending upon the activating agent used, the initial washes may be slightly acidified. The activating agents may then be recovered from the wash and recycled.

The activated carbon product may be dried under a vacuum until it reaches a constant weight. The preferred drying temperature is 100° C.

The characteristics of the final product may be analyzed by a number of techniques. The surface area of the activated carbon may be determined by the Brunauer-Emmet-Teller (BET) model of physical adsorption using nitrogen as the adsorptive. The micropore area and micropore volume of the activated carbon are determined by using the t-method, which is based on the BET information. All three measurements may be determined by using a Micromeritics apparatus model ASAP 2000. (Lowell et al., Powder Surface Area and Porosity, Shapman and Hall, New York, pp 75–86 (2nd ed., 1984)).

The pore geometry and mean size may be determined by Small-Angle X-Ray Scattering (SAXS) analysis of the product. (Imelik et al. ed., *Catalyst Characterization, Physical Techniques for Solid Materials*, Plenum, New York, pp 445–465 (1994)).

Finally, the morphology of the activated carbon may be determined by Scanning Electron Microscopy (SEM) using methods well known to the skilled artisan in this field.

The process of this invention offers several advantages over previously described processes. First, activated carbon of very high surface area and very narrow pore size distribution is produced, due to the increased impregnation of the activating agent by swelling the carbonaceous material in a polar solvent. Activated carbon is also produced in very high yield, as no gasification step is required after carbonization. The process is very efficient and economical, as effective carbonization and activation may occur in as little as 15 minutes of pyrolysis. The materials used for swelling and impregnation may be recovered and recycled.

The invention process for producing activated carbon products is illustrated by the following examples, although it will be understood that the invention is not limited thereto. The invention is not restricted to the particular materials, combinations of materials, and procedures selected for the purpose of illustration. Numerous variations of the details of the disclosed inventive process can be employed, as will be appreciated by those skilled in the art.

EXAMPLE 1 (Comparison)

A sample of Amaga coal (76.0% C, 16.3% O) was ground sufficiently to pass through the 100 mesh of the Tyler sieve, dried and stored in a desiccator until required. $ZnCl_2$ was used for the chemical dehydration. The coal sample and $ZnCl_2$ were placed in a high pressure autoclave, which was then purged and pressurized with high purity $N_2$. Pyrolysis for either 15 min or 180 min was carried out under high pressure at both 350° and 450° C. After pyrolysis, the product was washed with hot water until it was free of chloride ions. The recovery of activated carbon was determined from the weight of the final product.

The BET surface area, micropore area and micropore volume of the product was determined in a Micromeritics apparatus model ASAP 2000. SAXS analysis of the samples was carried out to determine the pore geometry and mean size. SEM was used to observe the morphology of the particles.

TABLE 1

| Run | Pyrolysis Temperature °C. | Pyrolysis Time (min) | Product yield (wt %, daf) | BET area ($m^2/g$) |
| --- | --- | --- | --- | --- |
| 1 | 350 | 15 | 74 | 3.0 |
| 2 | 350 | 180 | nd | 2.0 |
| 3 | 450 | 15 | 78 | 2.0 |
| 4 | 450 | 180 | 59 | 18.0 |

Pyrolysis using high pressure to impregnate $ZnCl_2$ into the coal particle: 100% $ZnCl_2$; under 100 bar $N_2$ in a high pressure autoclave.

The results of pyrolysis carried out under high pressure are shown in Table 1. In this procedure, there was no solvent added to the coal. Therefore, the mechanism to improve impregnation was the effect of the increased nitrogen pressure on the $ZnCl_2$ melt. The surface area of the original coal was about 8 $m^2/g$. The results in Table 1 show that $N_2$ pressure did not have any positive effect on surface area development. The reduction in the surface area of the recovered product, compared to that present in the coal before pyrolysis, could be ascribed to condensation of tarry material in the outer part of the coal particles. Scanning electron micrographs of the products revealed that there was a strong attack of $ZnCl_2$ on the surface of the particles. This effect was particularly pronounced in the experiments carried out at 450° C., causing a partial gasification of the sample, and therefore a low recovered yield.

EXAMPLE 2

A sample of Amaga coal was ground and stored as described in Example 1. The sample was then impregnated with $ZnCl_2$ by mixing it with either water or ethanol in which $ZnCl_2$ was dissolved. The coal-solvent mixture was left overnight. The solvent was evaporated, and the dry sample transferred to a porcelain crucible and pyrolyzed in a horizontal furnace at 600° or 650° C. for 15 min. Before pyrolysis, the furnace was purged with high purity $N_2$, and a flow of $N_2$ of 120 ml/min was maintained during the pyrolysis. After pyrolysis, the product was washed with hot water until it was free of chloride ions. The recovered activated carbon was determined from the weight of the residue.

The product was analyzed as described in Example 1. The results of pyrolysis carried out after impregnation of $ZnCl_2$ with either water or ethanol are shown in Table 2. Pyrolysis of the coal after impregnation with $ZnCl_2$ by using either water or ethanol showed a significant increase in the surface area of the product. Increasing the temperature of pyrolysis from 500° to 600° C. resulted in a slight increase in the surface area of the product. However, changing the solvent from water to ethanol resulted in a significant increase in the surface area of the product. The increase in surface area could be due to better penetration of the ethanol into the coal macrostructure, thereby facilitating the diffusion of the $ZnCl_2$. Similar results were obtained using methanol as the solvent (data not shown).

TABLE 2

| Run | Solvent | Pyrolysis Temperature (°C.) | Pyrolysis Time (min) | Product Yield (wt %, daf) | BET area ($m^2/g$) |
| --- | --- | --- | --- | --- | --- |
| 5 | Water | 500 | 15 | 79 | 186 |
| 6 | Water | 600 | 15 | nd | 239 |
| 7 | Ethanol | 500 | 180 | 70 | 546 |
| 8 | Ethanol | 600 | 15 | 77 | 696 |
| 9 | Ethanol | 600 | 180 | 60 | 647 |

Pyrolysis using water or ethanol to impregnate $ZnCl_2$ into the coal particle: 100% $ZnCl_2$; under atmospheric pressure and $N_2$ flow.

These observations suggested that use of a polar organic solvent with a high swelling capacity would improve the impregnation of $ZnCl_2$ into the coal particles.

EXAMPLE 3

Two low rank coals were used, Amaga coal (76% C, 5.5% H, 1.8% N, and 16.3% O) and Cerrejon coal (82.7% C, 5.5% H, 1.7% N, and 9.4% O). The samples were ground, and the fraction collected between the sieves 40–60 of the Tyler series was used for the experiments. Particles of greater size may also be used with similar results.

The desired amount of the activating agent, either $ZnCl_2$ or $SnCl_2$ (10%, 50%, or 100% based on the dry ash free coal sample), was dissolved in a fixed volume of pyridine, such that the proportion of coal:pyridine was 1:6 (weight:volume). In some cases, it was necessary to heat the mixture of solvent and activating agent to obtain complete dissolution of the agent. The coal was slowly added with continuous stirring to the solvent containing dissolved activating agent and this step usually took about 30 min. The resulting mixture was left untouched for 24 hours at room temperature. This time period may be shortened because the kinetics of solvent swelling show that swelling is a very fast process. The diffusion of the activating agent into the coal macrostructure is probably equally fast. The solvent was recovered by evaporation under slow heating at about 70° C. under nitrogen flow until the sample was completely dry. The solvent could also be more quickly recovered by heating at a higher temperature.

The dry sample was transferred into a porcelain crucible and placed into a horizontal furnace. A thermocouple placed next to the crucible was used to measure the temperature. The sample was carbonized under nitrogen of high purity at a flow of 100 to 120 ml/min. The pyrolysis temperature was either 600° or 650° C., but the temperature can be as high as 750° C. The time of pyrolysis was between 15 and 180 min. After pyrolysis, the sample was cooled down to about 100° C. under a flow of nitrogen, and then removed from the furnace. The activating agents, $ZnCl_2$ or $SnCl_2$, were recovered by washing the product with about 4 liters of hot distilled water until the wash was free of chlorides. The first two liters of water were slightly acidified with HCl.

The activated carbon product was dried at 100° C. under a vacuum until it attained a constant weight. Recovered yield was based on the final dry weight. The sample was analyzed as described in Example 1 and is shown in Table 3. Impregnation of the activating agent with a polar solvent resulted in a high surface area in the product. SAXS analysis revealed that pores were mainly spherical and cylindrical with a narrow pore distribution.

TABLE 3

| Coal | Activating Agent (conc) | Product Yield (wt %) | BET area ($m^2/g$) | Micropore Area ($m^2/g$) | Micropore Volume ($cm^3/g$) |
|---|---|---|---|---|---|
| Amaga | $ZnCl_2$, 0% | 69.4 | 8.0 | 6.4 | 0.002 |
| Amaga | $ZnCl_2$, 50% | 71.2 | 670 | nd | |
| Amaga | $ZnCl_2$, 100% | 71.7 | 1106 | 937 | 0.368 |
| Amaga | $SnCl_2$, 100% | 87.5 | 666 | 583 | 0.226 |
| Cerrejon | $ZnCl_2$, 100% | 81.9 | 1047 | 803 | 0.326 |

Pyrolysis using pyridine to impregnate either $ZnCl_2$ or $SnCl_2$ into the coal particle: Pyrolysis temperature of 650° C. and time of 15 min; under atmospheric pressure and $N_2$ flow.

The process of producing activated carbon by swelling it in a polar solvent containing activating agents, is much more efficient than those previously reported. Only one short step is required to produce the desired activated carbon product. The swollen impregnated carbon source is subjected to pyrolysis for only 15 min. to produce an activated carbon with a micropore volume of more than 0.25 $cm^3/g$. Thus, it is not necessary to further treat the activated carbon using oxygen or carbon dioxide at high temperatures.

Because gasification is not necessary, activated carbon is produced in significantly higher yields than in prior art methods. The gasification step usually results in a loss by burning of about 25% of the activated carbon. However, the process described here results in a relatively high recovered yield of about 60%–80%, compared to the lower recovered yield of 20%–50% from other methods.

The activated carbon produced should also be very suitable for methane and natural gas storage, as well as for environmental control of noxious gases due to the very narrow distribution of pore size.

Although the foregoing refers to particular preferred embodiments, it will be understood that the present invention is not so limited. It will occur to those of ordinary skill in the art that various modifications may be made to the disclosed embodiments and that such modifications are intended to be within the scope of the present invention, which is defined by the following claims.

All publications and patent applications mentioned in this specification are indicative of the level of skill of those in the art to which the invention pertains. All publications and patent applications are herein incorporated by reference to the same extent as if each individual publication or patent application were specifically and individually indicated to be incorporated by references in its entirety.

What is claimed is:

1. A process for preparing activated carbon comprising the steps of: (a) swelling a carbon-containing material in a polar organic solvent containing zinc chloride ($ZnCl_2$) or tin chloride ($SnCl_2$); (b) separating said solvent from said carbon-containing material; (c) carbonizing said carbon-containing material under nitrogen at a temperature in the range from 600° to 750° C.; and (d) separating said $ZnCl_2$ or $SnCl_2$ from said carbon-containing material.

2. The process according to claim 1, wherein said organic solvent is selected from the group consisting of pyridine, n-propylamine, n-butylamine, tetrahydrofuran, n-methylpyrrolidinone, dimethyl sulfoxide, methanol, ethanol and isopropanol.

3. The process according to claim 2, wherein said solvent is pyridine.

4. The process according to claim 1, wherein said carbon-containing material is a low rank coal.

5. The process according to claim 1, wherein the ratio of solvent (vol. in ml ) to carbon-containing material (weight in g) is 6:1.

6. The process of claim 1, wherein, in said step (a), said carbon-containing material is swollen in a polar organic solvent for from 1 hour to 24 hours.

7. The process of claim 1, wherein said step (c) of carbonizing said carbon-containing material is carried out for 15 minutes.

8. A process for preparing activated carbon comprising the steps of: (a) swelling a carbon-containing material in a polar organic solvent containing zinc chloride ($ZnCl_2$) or tin chloride ($SnCl_2$); (b) separating said solvent from said carbon-containing material; and (c) carbonizing said carbon-containing material under nitrogen at a temperature in the range from 600° to 750° C.

9. The process of claim 8, further comprising the step of, after said step (c), separating said $ZnCl_2$ or $SnCl_2$ from said carbon-containing material.

10. The process of claim 9, wherein said step of separating said $ZnCl_2$ or $SnCl_2$ from said carbon-containing material comprises washing said carbon-containing material with water.

* * * * *